United States Patent [19]

Chobotov

[11] Patent Number: 4,987,775
[45] Date of Patent: Jan. 29, 1991

[54] PROPELLANT MEASUREMENT SYSTEM

[75] Inventor: Michael V. Chobotov, Palos Verdes Estates, Calif.

[73] Assignee: HAC, Los Angeles, Calif.

[21] Appl. No.: 251,740

[22] Filed: Oct. 3, 1988

[51] Int. Cl.⁵ .................................................. G01F 17/00
[52] U.S. Cl. ......................................................... 73/149
[58] Field of Search ................................. 73/149, 290 B

[56] References Cited

U.S. PATENT DOCUMENTS

| | | | |
|---|---|---|---|
| 1,885,926 | 11/1932 | Lewis | 73/290 B |
| 2,378,849 | 6/1945 | Helleberg et al. | 73/290 B |
| 2,381,821 | 8/1945 | Helleberg et al. | 73/290 B |
| 2,696,113 | 12/1954 | Prescott et al. | 73/290 R |
| 3,234,785 | 2/1966 | Rimsha | 73/149 |
| 3,237,451 | 3/1966 | Haeff | 73/149 |
| 3,962,916 | 6/1976 | Bouchy et al. | 73/290 B |
| 4,722,183 | 2/1988 | Rosen . | |
| 4,729,245 | 3/1988 | Hansman, Jr. | 73/149 |

FOREIGN PATENT DOCUMENTS 0020814 2/1984 Japan ........................................ 73/149
0232536 10/1969 U.S.S.R. ................................... 73/149

Primary Examiner—Robert Raevis
Attorney, Agent, or Firm—Robert A. Westerlund; Steven M. Mitchell; Wanda K. Denson-Low

[57] ABSTRACT

A propellant measurement system 10 capable of accurate propellant measurement within a low gravity environment is disclosed herein. The propellant measurement system 10 of the present invention includes a pressurization tank 20 of a first volume $V_p$ for enclosing a pressurization gas at a first pressure $P_p$. The propellent measurement system 10 further includes a propellant tank 40 of a second volumre for storing propellant matter at a second pressure $P_u$, the first pressure $P_p$ being chosen to be larger than the second pressure $P_u$. A valve apparatus 60 in communication with the pressurization and fuel tanks 20 and 40 allows a portion of the pressurization gas to flow into the fuel tank 40. Pressure gauges 65 and 70 sense changes in the first and second pressures $P_p$ and $P_u$ in response to the flowing of the pressurization gas.

1 Claim, 1 Drawing Sheet

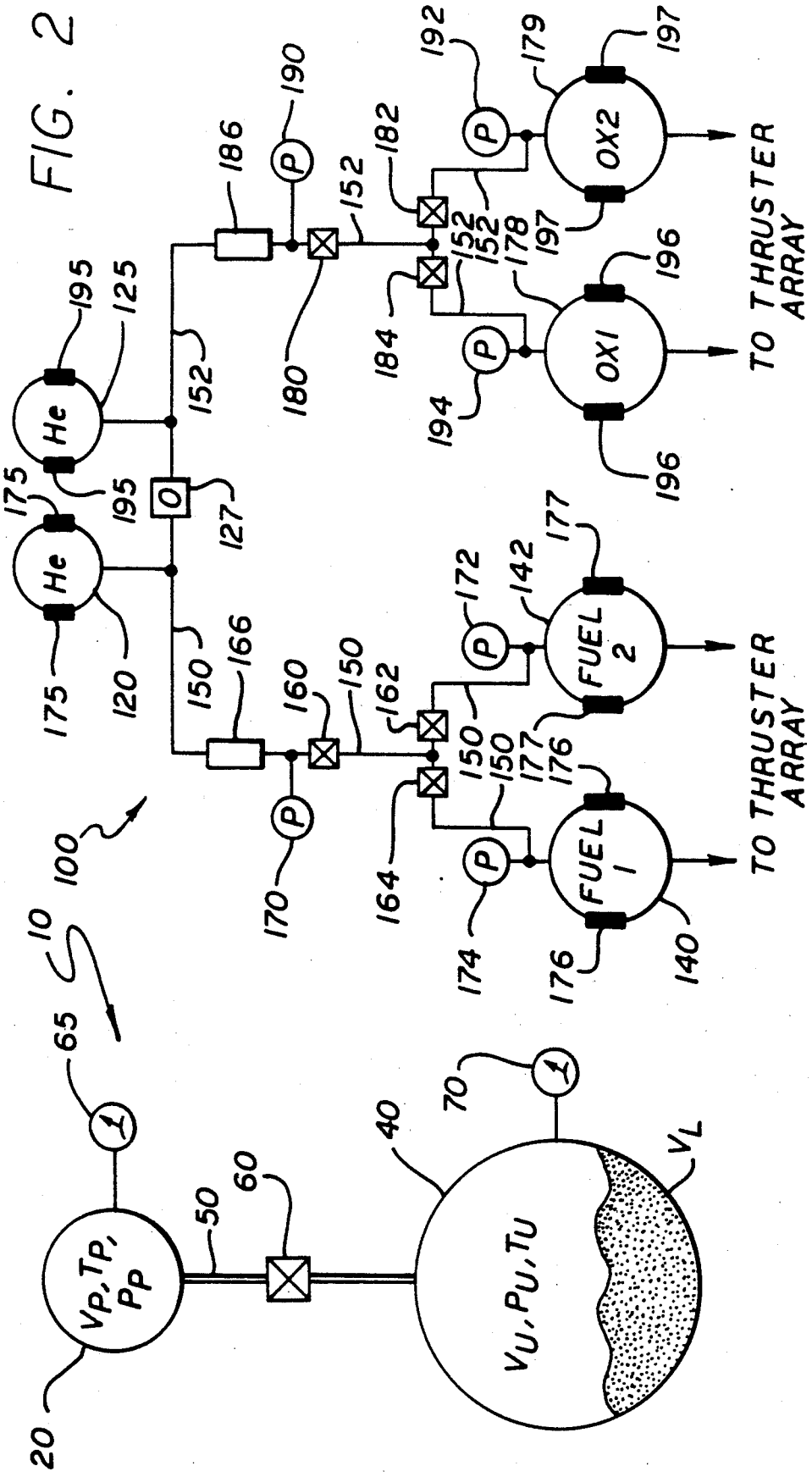

PROPELLANT MEASUREMENT SYSTEM

BACKGROUND OF THE INVENTION

1. Field of the Invention

The present invention relates to propellant measurement within propulsion systems. More specifically, the present invention relates to propulsion system propellant measurement in low gravity environments.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

In spin-stabilized spacecraft the artificial gravitational field generated therein enables the employment of conventional fuel measurement schemes. For example, for liquid propellants the height of the liquid within the spacecraft propellant tank may be measured or the liquid pressure at the bottom of the tank may be gauged. However, conventional gravity based fuel measurement methods are inappropriate for thruster-stabilized spacecraft due to the absence of a gravitational field of sufficient magnitude.

Accordingly, alternative methods have been developed to estimate the amount of propellant remaining within spacecraft propulsion systems operative in low gravity environments. One such method includes monitoring changes in the absolute pressure within a propellant tank to thermodynamically deduce the volume of propellant remaining in the tank. Unfortunately, the narrow range of absolute pressures within the propellant tanks from the beginning to the end of a mission often results in unacceptable measurement error. For example, in the case of geosynchronous satellites up to eighty percent of the propellant carried thereby may be expelled simply to attain orbit. Thus, as little as twenty percent of the initial propellant load may remain at the onset of the useful life of the satellite. As the absolute pressure changes of the remaining propellant load are relatively small between the beginning and end of the useful life of the satellite, predictions as to the time of expiration of satellite propellant are prone to significant error.

A second approach to low gravity propellant measurement has been commonly termed the "bookkeeping" approach. Specifically, in the bookkeeping method the mass of propellant initially loaded into the spacecraft is recorded. As spacecraft thrusters are fired for attaining orbit and for station keeping the amount of propellant expelled is estimated. The amount of propellant remaining is simply the difference between that initially loaded into the spacecraft and that estimated to have been expelled. However, uncertainty with respect to temperature and pressure thrust parameters lead to errors in determination of the actual quantity of propellant consumed. Not surprisingly such errors tend to accrue over the useful life of the spacecraft—making predictions as to the end of the spacecraft life increasingly uncertain as time progresses. Further, the bookkeeping approach is incapable of accurately accounting for propellant leakage. In practice, the bookkeeping method of propellant measurement may yield end of life predictions in error by as much as one year on missions of approximately ten years. Hence, propellant measurement through both absolute pressure determination and bookkeeping schemes is subject to significant error.

The uncertainty in forecasting the probable time of spacecraft propellant expiration and termination of the useful life thereof tend to complicate mission planning. For example, replacement spacecraft typically need to be launched early enough so as to be operational and in orbit upon the termination of operation of the initial spacecraft. Hence if end of life predictions have an uncertainty of one year, replacement spacecraft may need to be launched a year in advance of the time launch would need to occur were the time of propellant expiration known with absolute certainty. As is well known, maintaining a replacement satellite in orbit during this uncertainty period is inefficient and tends to increase costs.

Hence, a need in the art exists for an accurate propellant measurement system capable of operation in a low gravity environment.

SUMMARY OF THE INVENTION

The need in the art for an accurate propellant measurement system capable of operation in a low gravity environment is addressed by the propellant measurement system of the present invention. The propellant measurement system of the present invention includes a pressurization tank of a first volume for enclosing a pressurization gas at a first pressure. The propellant measurement system further includes a propellant tank of a second volume for storing propellant matter at a second pressure, the first pressure being chosen to be larger than the second pressure. A valve apparatus in communication with the pressurization and propellant tanks allows a portion of the pressurization gas to flow into the propellant tank. Pressure gauges sense changes in the first and second pressures in response to the flowing of the pressurization gas. These pressure changes and other parameters are employed in a thermodynamic relationship to determine propellant volume within the propellant tank. In the case of a bipropellant system, this system may also be used to control the relative consumption rates of the fuel and oxidizer species through selective pressurizations as deemed necessary through propellant measurement information. Propellant residuals at end of mission life (oxidizer or fuel) can thus be reduced, hence extending mission life, as well.

BRIEF DESCRIPTION OF THE DRAWINGS

FIG. 1 is a functional schematic diagram of a simplified embodiment of the propellant measurement system of the present invention.

FIG. 2 is an illustrative representation of a preferred embodiment of the propellant measurement system of the present invention adapted for deployment in a bipropellant propulsion system.

DETAILED DESCRIPTION OF THE INVENTION

FIG. 1 is a functional schematic diagram of a simplified embodiment of the propellant measurement system 10 of the present invention. The measurement system 10 includes a pressurization tank 20 of volume $V_p$. The tank 20 includes a pressurization gas at pressure $P_p$ and temperature $T_p$. The system 10 further includes a propellant tank 40 of volume $V_T$. The tank 40 includes a generally liquid propellant occupying a volume $V_L$. The portion of the tank 40 unoccupied by the liquid phase of the propellant has an ullage volume $V_u$, a pressure $P_u$ and a temperature $T_u$. The tanks 20 and 40 are interconnected by a gas line 50. Gas flow through the line 50 is controlled by a latch valve 60. Additionally, the pressure $P_p$ within the tank 20 is monitored by a first absolute pressure transducer 65 in communication therewith. Similarly, a second absolute pressure transducer 70 monitors the pressure Pu within the ullage volume $V_u$ of the tank 40. The temperatures $T_p$ and $T_u$ of the tanks 20 and 40 are ascertained by temperature sensors (not shown) operatively coupled thereto.

The propellant measurement system 10 is adapted to determine the ullage volume $V_u$ of the tank 40 and thereby determine the volume of remaining propellant $V_L$ through the expression $V_L = V_T - V_u$. The ullage volume $V_u$ is determined in the following manner. First, the pressure $P_p$ is chosen to be larger than the pressure $P_u$ in order that the pressurization gas within the tank 20 flows into the tank 40 upon opening of the valve 60. The valve 60 is opened until a suitably measurable increase occurs in the pressure $P_u$ within the chamber 40. The valve 60 is then closed and the changes in the pressures $P_p$ and $P_u$ are determined from the pressure transducers 65 and 70. The ullage volume $V_u$ may now be determined by noting that during the above process gas is conserved within the system 10. Accordingly, from fundamental thermodynamic equations assuming an isothermal process:

$$(P_p*V_p/T_p) + (P_u*V_u/T_u) = \quad [1]$$
$$(P_p - dP_p)*V_p/T_p + (P_u + dP_u)*V_u/T_u$$

where
$dP_p$ = the change in $P_p$ as measured by the first pressure transducer 65.
$dP_u$ = the change in $P_u$ as measured by the second pressure transducer 70.

After simple algebra, $$dP_p*V_p/T_p = dP_u*V_u/T_u \quad [2]$$

Hence, $$V_u = (T_u/T_p)*(dP_p*V_p/dP_u) \quad [3]$$

From which the volume of propellant remaining in the tank 40 may be expressed as:

$$V_L = V_T - V_u = V_T - (T_u/T_p)*(dP_u) \quad [4]$$

Although equation [4] is obtained assuming an isothermal process, the present invention is not limited to such a process. For example, those skilled in the art may adapt equation [4] to accommodate measurements performed under adiabatic conditions.

As mentioned in the Background of the Invention, conventional propellant measurement schemes are typically not disposed for operation in low gravity environments. As equation [4] is independent of gravity it is therefore a feature of the present invention to effect propellant measurement in the absence of a gravitational field.

FIG. 2 is an illustrative representation of a preferred embodiment of the fuel measurement system 100 of the present invention adapted for deployment in a bipropellant propulsion system. The system 100 includes first and second pressurization tanks 120 and 125 respectively coupled to gas lines 150 and 152. A normally open squib valve 127 is pyrotechnically fired closed upon commencement of on-station propulsion system operation to mutually isolate the gas lines 150 and 152. The gas line 150 branches to connect the first Helium pressurization tank 120 with first and second fuel tanks 140 and 142. The fuel tanks 140 and 142 are filled with a generally liquid propellant fuel such as MMH=Monomethyl Hydrazine, $CH_3NHNH_2$. The pressure of the Helium within the tank 120 is chosen to be larger than the Helium pressurant gas pressure within tanks 140 and 142. First, second and third conventional latch valves 160, 162 and 164 allow Helium gas from the first pressurization tank 120 to flow either into the first or second fuel tank 140 or 142. A conventional filter 166 in communication with the valve 160 prevents contaminants from the pressurization tank 120 from entering the latch valves 160, 162, or 164, or either of the fuel tanks 140 or 142. In addition, the first, second and third latch valves 160, 162 and 164 serve to mutually isolate first, second and third high resolution pressure transducers 170, 172 and 174. The pressure transducers 170, 172 and 174 are disposed to monitor the gas pressure within the first pressurization tank 120, the second fuel tank 142 and the first fuel tank 140, respectively. The pressure transducers 170, 172 and 174 should be of suitably high resolution to enable accurate measurements of the pressure changes within the tanks 120, 140, and 142, allowing accurate estimates of the volume of propellant fuel remaining in the first and second fuel tanks 140 and 142. For example, Aeroquartz high resolution pressure transducers manufactured by Paroscientific are capable of 0.0001 psi resolution and 0.03% full scale accuracy. The temperatures within the tanks 120, 140 and 142 are respectively gauged by first, second and third sets of temperature sensors 175, 176 and 177.

The second Helium pressurization tank 125 is connected by the gas line 152 to first and second oxidizer tanks 178 and 179. The oxidizer tanks 178 and 179 include an oxidizer which will ignite propellant fuel from the tanks 140 and 142 when brought in contact therewith within a thruster array (not shown). In the embodiment of FIG. 2 the oxidizer consists of nitrogen tetroxide mixed with a 3% concentration of nitric oxide (for freezing point reduction in spacecraft applications). Again, the pressure of the Helium within the tank 125 is chosen to be larger than the Helium pressurant gas pressure within the tanks 140 and 142. Fourth, fifth and sixth conventional latch valves 180, 182 and 184 allow Helium gas from the second pressurization tank 125 to flow either into the first or second oxidizer tank 178 or 179. Again, a conventional filter 186 in communication with the valve 180 prevents contaminants from the pressurization tank 125 from entering the latch valves 180, 182, or 184, or either of the oxidizer tanks 178 or 179. In addition fourth, fifth and sixth high resolution pressure transducers are positioned to respectively monitor the pressures of the second pressurization tank 125, the second oxidizer tank 179 and the first oxidizer tank 178. The temperatures within the tanks 125, 178 and 179 are determined by fourth, fifth and sixth sets of temperature sensors 195, 196 and 197 respectively coupled thereto.

The fuel tanks 140 and 142 in conjunction with the oxidizer tanks 178 and 179 are typically utilized to supply a thruster array within a bipropellant propulsion system (not shown). For example, the first fuel tank 140 and the first oxidizer tank 178 may be coupled to a particular group of thrusters within the bipropellant system. Fuel from the tank 140 and oxidizer from the tank 178 are induced to flow to the thruster array by virtue of the Helium pressurization gas provided by the tanks 120 and 125. Conventional solenoid valves are employed to regulate the supply of fuel and oxidizer at each individual thruster. Selective pressure increases within the propellant tanks can be effected by the propellant measurement system to also optimize fuel/oxidizer relative consumption rates, thus increasing system performance. In this manner the propellant measurement system 100 of the present invention may be included within a bipropellant propulsion system.

The system 100 is operative to determine the volume of propellant within the tanks 140, 142, 178 and 179 by using equation [4] in the manner outlined with reference to Fig. For example in applying equation [4] with respect to the tank 140, the volume of fuel therein and the tank volume thereof respectively correspond to $V_L$ and $V_T$. In addition, the unoccupied portion of the tank 140 corresponds to the ullage volume $V_u$ in equation [4], while $T_u$ and $P_u$ are read from the temperature sensors 176 and pressure transducer 174. Similarly $V_p$, $T_p$ and $P_p$ of equation [4] correspond to the volume, temperature and pressure of the first pressurization tank 120. When the propellant measurement system of FIG. 2 is deployed in a spacecraft propulsion system operative in the "station keeping" mode (i.e. the mode used to maintain geosynchronous orbit), the pressure within the first pressurization tank 120 is typically between 200 and 600 psi. To effect measurement of the volume of liquid fuel within the fuel tank 140 the valves 160 and 164 are opened. The valves 160 and 164 are held open for a time period (typically 1 to 2 minutes) which will allow a suitably discernible increase to occur in the pressure $dP_u$ of the tank 140 (e.g. 1 to 2 psi). The pressure change in the tank 140 determines the value of $dP_u$ in equation [4]. The associated decrease in the pressure $P_p$ of the pressurization tank 120, the value of $dP_p$ in equation [4], will typically be on the order of 10 psi assuming operation in the station keeping mode. Again, as equation [4] assumes an isothermal process the pressure measurements described above should be taken after temperature stabilization of the tanks 120 and 140. Monitoring of the pressures of the tanks not involved in the particular measurement process can be used to determine reestablishment of thermal equilibrium within the tanks involved in the measurement process.

As is evident upon inspection of FIG. 2 the volume of fuel remaining in the second fuel tank 142 may be determined in the manner described above using the first pressurization tank 120 and the valves 160 and 162. Similarly, measurement of the oxidizer remaining in the tanks 178 or 179 is accomplished using the second pressurization tank 125, the valve 180, and either the valve 184 or the valve 182.

In order to obtain more accurate propellant volume measurements equation [4] may be modified by one skilled in the art to include additional terms which model tank stretching (volume change with pressure) and gas compressibility. In addition the ullage volume $V_u$ in equation [4] may be computed more accurately by considering the effect of the propellant partial pressure on the specific volume of the injected Helium pressurant. Generally smaller corrections can typically be made for helium solubility in the propellant and for propellant compressibility. These smaller corrections may be quantified by empirical data available to those skilled in the art.

Thus the present invention has been described with reference to a particular embodiment in connection with a particular application. Those having ordinary skill in the art and access to the teachings of the present invention will recognize additional modifications and applications within the scope thereof. For example, the relative sizes of the pressurization and propellant tanks may differ from that disclosed herein. Similarly, the invention is not limited to the particular valve network used to control the flow of gas between pressurization and propellant tanks, nor is the composition of the pressurization gas restricted to Helium. In addition, the fuel measurement system of the present invention may be utilized in applications wholly unrelated to propulsion to measure the occupied volume of an enclosed chamber of known volume. As mentioned above, with access to the teachings herein it will be apparent to one skilled in the art to modify equation [4] to model certain second order effects.

It is therefore contemplated by the appended claims to cover any and all such modifications.

Accordingly,

What is claimed is:

1. A method of measuring the volume of a propellant $V_L$ enclosed at a first pressure $P_U$ within a first tank of a first volume $V_T$, where the tank volume $V_T$ is equal to the volume of the propellant $V_L$ plus an ullage volume $V_U$, said method comprising the steps of:

(a) enclosing a pressurization gas of a second volume $V_p$ in a second tank at a second pressure $P_p$, said second pressure $P_p$ being greater than said first pressure $P_U$;

(b) injecting a portion of said pressurization gas into said first tank;

(c) measuring the changes in said first and second pressure $dP_U$ and $DP_p$ respectively in response to said injection of said pressurization gas;

(d) measuring the temperatures of said ullage volume $T_U$ and said pressurization gas $T_p$;

(e) calculating the ullage volume $V_U$ of said first tank using said change in said first and second pressures $dP_U$ and $dP_p$ respectively in conjunction with said first and second volumes $V_T$ and $V_p$ respectively in accordance with the following equation:

$$V_u = (T_u/T_p) * (dP_p * V_p / dP_u); \text{ and}$$

(f) subtracting said ullage volume $V_u$ from said first $V_T$ volume to determine said propellant volume $V_L$.

* * * * *